INVENTORS:
ROBERT G. LE TOURNEAU
CHARLES CONAN ROE

Jan. 4, 1955   R. G. LE TOURNEAU ET AL   2,698,919
ELECTRIC GENERATING SYSTEM FOR BULLDOZING TRACTORS
Filed Aug. 22, 1949   3 Sheets-Sheet 3

INVENTORS:
ROBERT G. LE TOURNEAU
CHARLES CONAN ROE
BY
ATTORNEYS

United States Patent Office 2,698,919
Patented Jan. 4, 1955

2,698,919

ELECTRIC GENERATING SYSTEM FOR BULLDOZING TRACTORS

Robert G. Le Tourneau and Charles Conan Roe, Longview, Tex., assignors to R. G. Le Tourneau, Inc., Peoria, Ill., a corporation of California Application August 22, 1949, Serial No. 111,658

10 Claims. (Cl. 322—6)

This invention relates to heavy duty construction tractors and more particularly to the type equipped with a blade for bulldozing operations.

The primary object of this invention is to provide a tractor of this type in which all of its functions are electrically powered and controlled, i. e., wheel drive, steering, and blade hoist.

Another object is to provide a tractor in which an internal combustion engine drives a two circuit generator, each circuit of which supplies power to the wheels on the same side to permit electric steering control.

A still further object is to provide a tractor which contains novel individual self-contained wheel driver units which can be readily replaced in the field and returned to the shop for repair.

An additional object is to provide a unique potentiometer for controlling the speed, steering, and forward or reverse movement.

Yet another object is to provide a structure for a bulldozing tractor in which the operator's cab is above and partially overhanging the blade control A frame so that no part of this frame interferes with his front vision.

These objects are accomplished by means of such structure and relative arrangement of parts as will appear by a perusal of the following specifications and claims.

Figure 1:
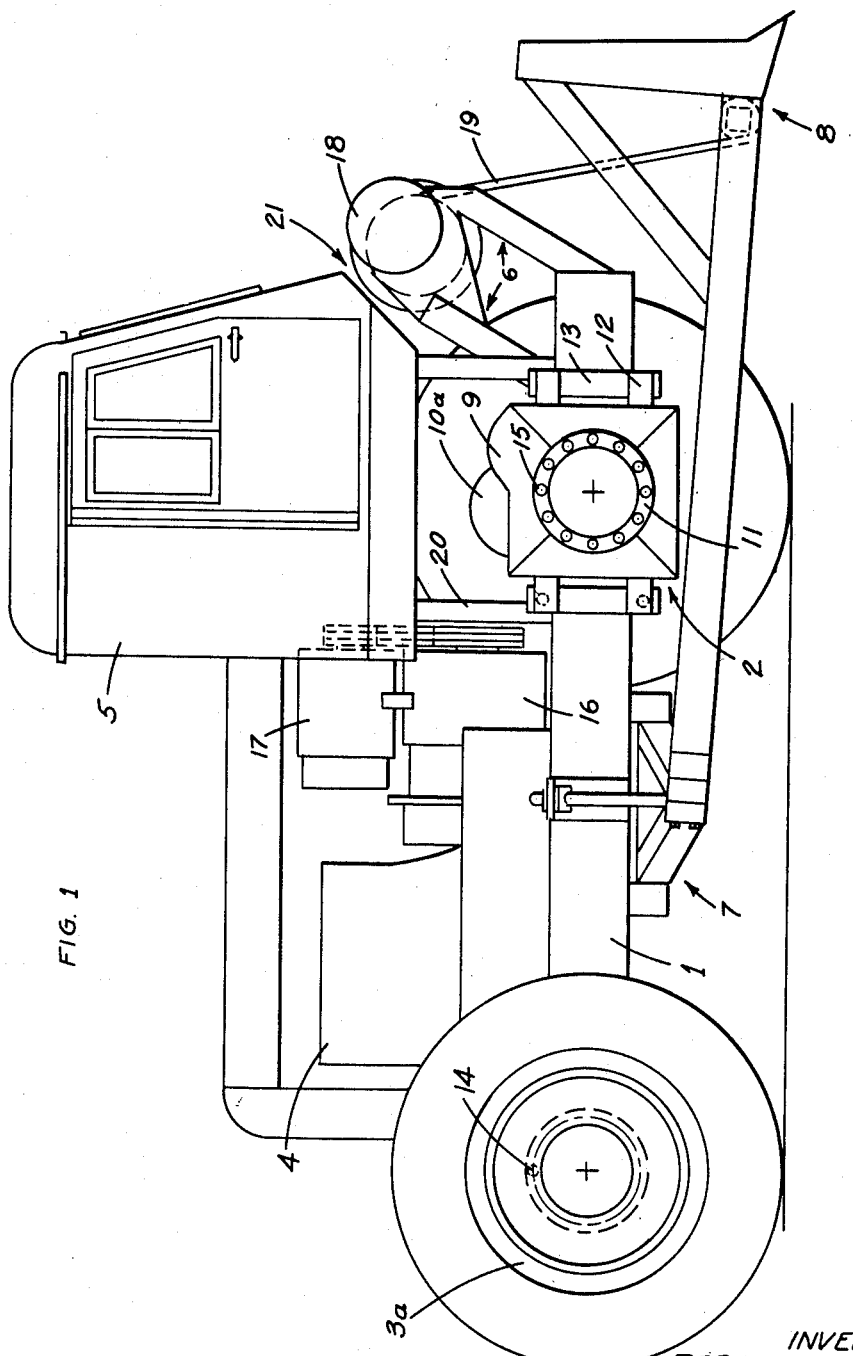
Fig. 1 is a side elevation, with the right-front wheel removed, of this electric tractor showing the relative location of its parts.

Referring now to the drawing, in Fig. 1 the tractor is seen to consist of a main frame 1, on which are removably mounted four wheel drivers 2 attached to and driving four pneumatic tired wheels 3a (and 3), an internal combustion engine 4 equipped with a radiator and hood, a cab 5, a hoist frame 6, a bulldozer blade mount 7, and an attached bulldozer blade unit 8.

The wheel drivers 2 amount to an enclosed gear box 9, on which is mounted an electric motor 10a (and 10) and from which projects a flanged drive shaft 11. The wheel drivers also include mounting arms 12 for attachment to vertical mounting pads 13 which are welded to frame 1. Wheels 3a and 3 include a bolt circle 14 which aligns with the tapped holes 15 of flanged shaft 11 for mounting thereto. It will be seen that the wheel drivers 2, by this construction, may be readily removed in the field and replaced or returned to a shop for maintenance.

On this all-electric machine the purpose of internal combustion engine 4 is solely to drive the large main generator 16 and exciter generator 17 both of which are D. C. machines, and which together supply electrical current for all of the operations and functions of the tractor.

Hoist frame 6 is attached to frame 1 and supports an electric winch 18 which controls cable 19 and its attached blade unit 8 for the raising and lowering thereof. This winch 18 is so positioned by the hoist frame 6 that it fits within an undercut portion 21 of cab 5. The hoist frame 6 attaches to the main frame at points within the projected base of cab 5, due to its elevation from the main frame onstilts 20. By this positioning, the hoist frame and winch are well out of the normal line of vision of an operator seated within the cab.

Figure 2:
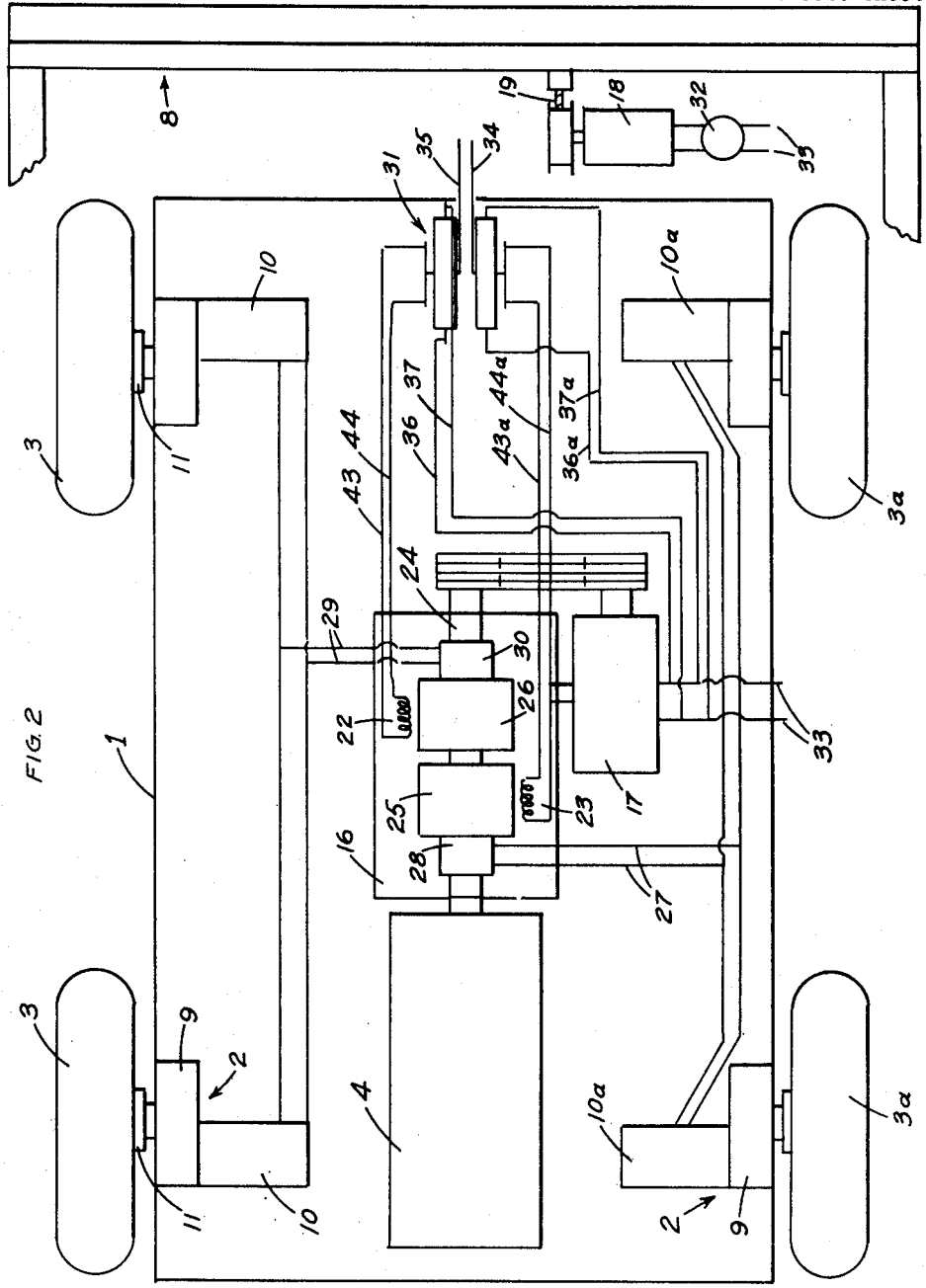
Fig. 2 is a plan view in schematic showing the electrical circuit.

Referring to Fig. 2, the electrical circuit of this machine is seen to include a two circuit main generator 16 equipped with two field windings 22 and 23, and containing a single rotor shaft 24 on which are two armatures 25 and 26. The output leads 27 connected thru a commutator 28 from armature 25 carry current to the drive motor 10a on the right side of the vehicle. Output leads 29 from commutator 30 of armature 26 carry this current to the drive motors 10 on the left hand side. Now by means of a dual potentiometer control 31 the amount of current from the exciter generator 17 to field coils 22 and 23 of generator 16 is positively controlled. It will be recognized that the amount of current supplied to the field coils will determine the amount of current produced in the generator armatures for a given speed of rotation.

The exciter generator 17 is turning and putting out current at all times that the engine 4 is running. Likewise main generator shaft 24 is turning. However, the main generator puts out no current unless field 22 or 23 is energized. Then the current output from armatures 25 or 26 is proportional to the input current to their respective field windings. Generator 17 also supplies current direct to the blade hoist winch 18 thru a suitable control switch 32 and leads 33.

With this arrangement, if it is desired to steer to the right, considering the vehicle is at a stand-still and levers 34 and 35 are in their neutral position, the left lever 35 is pushed forward. This will permit current of a polarity to cause ultimate forward motion to be supplied the wheels on the left side. Since the right wheel motors are receiving no current, they will slide or pivot in response to the turning motion imparted to the vehicle by the driving left wheels. If the vehicle is in forward motion, both levers will be forward to the same degree depending on the speed desired; if a turn is now desired to the right, the right hand lever is pulled back toward neutral until the desired degree and speed of turning are accomplished. It is even possible to have the wheels on one side in forward motion and the wheels on the opposite side in reverse for a very sharp turn.

Figure 3:
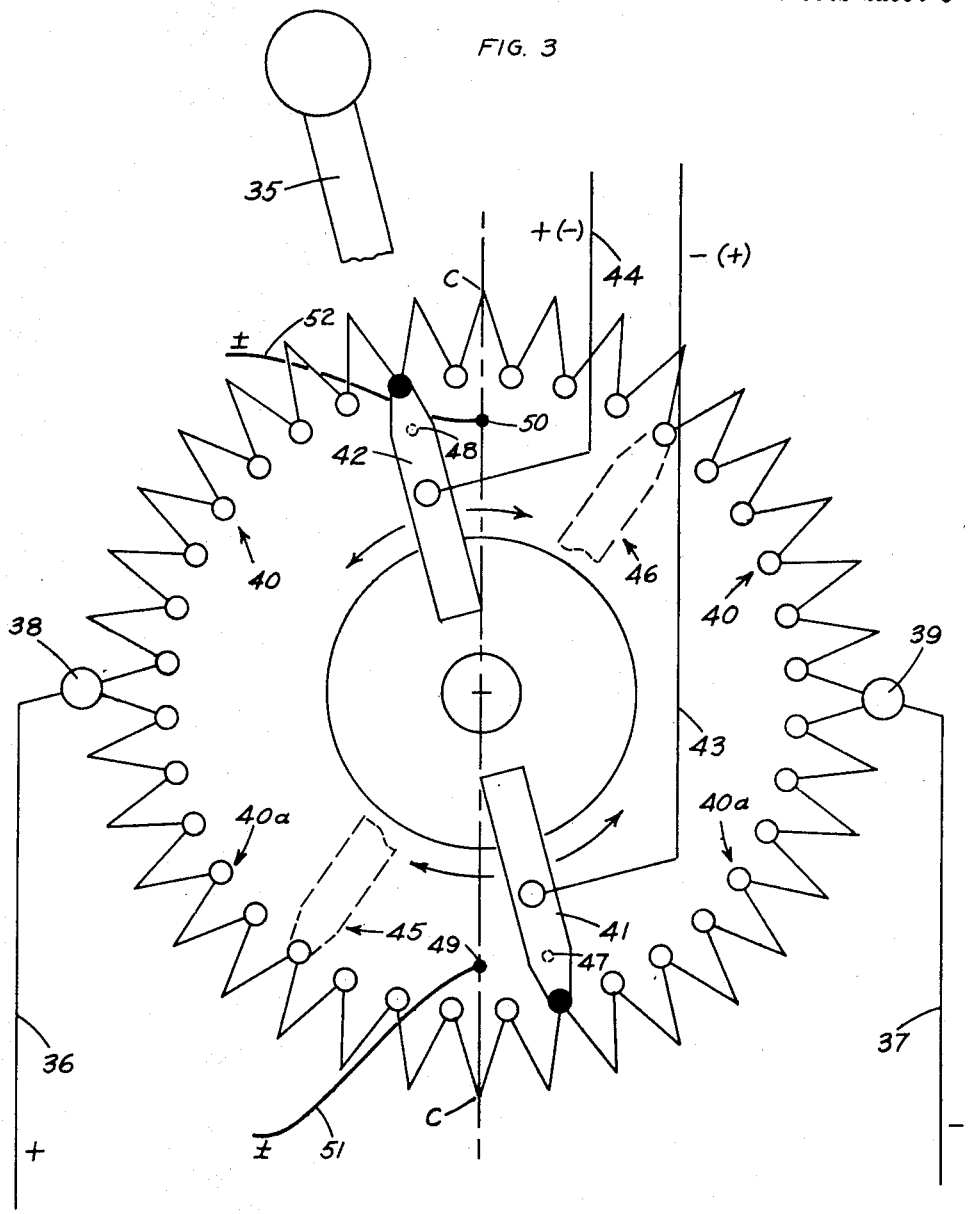
Fig. 3 is a schematic of the potentiometer control circuit.

The potentiometer 31 may be examined in more detail by reference to Fig. 3. This figure represents a schematic of the action of one of the potentiometers in response to movement of its control lever. Leads 36 and 37 represent the input from exciter generator 17 which connect at 38 and 39 and are separated from each other by an equal resistance as in rheostat sections 40 and 40a, although these resistances need not be symmetrically arranged as shown in the schematic. Contactors 41 and 42 include output leads 43 and 44 to deliver the resulting current from the resistances to the generator field which, assuming this schematic to be the left one, would be field 22. It will be seen that the negative current coming in thru lead 37 will take the path of least resistance and travel clockwise around the ring of resistances in section 40a until it reaches contactor 41, from whence it will pass into output lead 43 and be delivered to the generator field 22. We are assuming here, as modern tests have, that electricity flows from minus to plus, in which case the returning current may be thought of as passing thru lead 44 into contactor 42 and then counterclockwise around the resistances 40 until it reaches terminal 38 from which it completes the cycle to the exciter generator by means of lead 36. This will cause generator field 22 to have a certain polarity and the polarity of the output current of armature 26 will be determined thereby as will the ultimate direction of rotation of wheels 3 on the left side of the vehicle. Now as handle 35 is moved rearward until contactor 41 passes the resistance center C, the amount of resistance between its new position 45 and terminal 39 is now greater than the resistance from 45 and terminal 38, and also greater than the resistance from terminal 39 to the new position 46 of the other contactor 42. Since electricity will take the path of least resistance, the circuit now becomes minus from input lead 37 through output lead 44 and positive from output lead 43 through input return lead 36. This ultimately causes a reverse rotation of the wheels.

It is well known that a generator field which has been supplied direct current of one polarity will maintain a certain amount of residual magnetism of a corresponding polarity after the D. C. supply is withdrawn. This residual magnetism will present a counter-force to the establishment of magnetism of a reverse polarity by introduction of a D. C. supply of a reverse polarity. In the invention at hand this will have the effect of a sluggish reaction of the motors 10 and 10a which are supplied with current from the generator 16. In order to overcome this tendency, alternating current is momentarily circulated thru the generator field to neutralize any residual magnetism therein, by the means herein described:

A. C. contacts 47 and 48 have been installed on the underside of contactors 41 and 42. Corresponding contacts 49 and 50 are placed on the center line of the potentiometer so that when the contactors are in their neutral position C, these A. C. contacts will be engaged. The stationary contacts 49 and 50 are connected by leads 51 and 52 to a suitable single-phase A. C. supply.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. In an electrical control system, a D. C. generator including field windings, a separate D. C. exciter for supplying exciter current to said windings, a potentiometer inserted in a circuit between said exciter and said generator, means within the potentiometer to reverse the polarity of the D. C. current supplied to the field windings, and means to neutralize the residual magnetism in said field windings, said last named means comprising a separate A. C. supply, means within the potentiometer to introduce said A. C. into the circuit to the field windings at the instance of reversal of polarity thereof.

2. In an electrical control system of the character described, an electro-mechanical machine including a field winding, a source of continuous voltage for supplying current to said winding, a potentiometer having a contactor and connected in a circuit between said source and said winding, means within the potentiometer to reverse the polarity of the continuous current supplied to said field winding, there being a point on said potentiometer beyond which movement of said contactor in the same direction causes a reversal of the continuous voltage supplied to said field winding, means for neutralizing the residual magnetism in said field winding, said last named means comprising an alternating current source, and means within the potentiometer and including said contactor to connect said alternating current from said alternating current source to said field winding when said contactor reaches said point at the instant of reversal of polarity of said winding.

3. In an electric steering system for a tractor, a potentiometer comprising two control levers, two circular rheostats, input supply and input return leads attached to each of said rheostats, said leads being separated from each other by equal resistances, a source of continuous voltage connected to said supply leads, a generator, a field winding of said generator connected to said return leads, a pair of diametrically opposed contactors concentric with each rheostat, said levers operative to rotate each pair of contactors around its corresponding rheostat selectively, an alternating current supply, said potentiometer including a pair of contacts connected to opposite terminals of said alternating current supply, said last mentioned contacts being disposed midway between said input supply leads, and said pair of contactors contacting the last mentioned contacts when said levers are disposed midway between said input supply leads.

4. In a direct current electric steering system, a potentiometer comprising two control levers, two circular rheostats, positive and negative input leads attached to each rheostat, a continuous voltage supply connected to said leads, said leads separated from each other by an equal series of resistance, a pair of diametrically opposed contactors concentric with each rheostat, said levers operative to rotate each pair of contactors around its corresponding rheostat selectively, positive and negative output leads associated with each pair of contactors, a generator, a field winding of said generator connected to said positive and negative output leads, a point of balanced resistance on said resistance ring arranged to cause said output leads to reverse polarity when said contactors pass this said point, an alternating current supply, said potentiometer including a pair of terminals connected to opposite terminals of said A. C. supply, said last mentioned potentiometer terminals being engaged by said pair of contactors when said contactors are at said point of balanced resistance.

5. In an electrical circuit, a potentiometer comprising a circular rheostat containing equally spaced resistances, diametrically opposed input terminals, a supply of continuous voltage connected to said input terminals, diametrically opposed contactors mounted concentrically with said circular rheostat and adapted for relative movement therewith, said contactors adapted to engage said resistances in sequence, output leads connected with said contactors, a generator, a field winding of said generator connected to said output leads, there being a point of balanced resistance on the rheostat beyond which movement of said contactors in the same direction will result in reversal of the polarity of said output leads, an alternating current source, said potentiometer incorporating a pair of terminals connected to said alternating current source and disposed adjacent said point of balanced resistance and engageable by said contactors to introduce an alternating current in said field winding when said contactors are at said point of balanced resistance.

6. In an electrical circuit, a potentiometer comprising a circular rheostat, input terminals connected to said rheostat and separated from each other by equal resistances, a source of continuous voltage connected to said input terminals, contactors pivoted concentrically with said rheostat, said contactors engaging said resistances, a generator, a field winding of said generator having opposite terminals thereof connected to said contactors, there being a point of balanced resistance on said rheostat beyond which movement of said contactors in the same direction will result in reversal of polarity of said output leads, and an A. C. source connected with said contactors when said contactors are at the point of balanced resistance.

7. In an electrical circuit, a potentiometer comprising a circular rheostat made up of a series of equally spaced resistances, said rheostat separated into two equal sections by input terminals, a source of continuous voltage connected to said input terminals, opposed contactors adapted to move over said resistances in sequence, a generator, a field winding of said generator having opposite terminals thereof connected to opposed contactors, a point of balanced resistance midway between the terminals on each section, the output E. M. F. applied to said field winding varying from zero when the contactors are at the point of balanced resistance to full load of one polarity when the contactors are adjacent the input terminals, a source of alternating voltage, said potentiometer including a pair of terminals disposed adjacent said point of balanced resistance and connected to opposite terminals of said alternating current source, said potentiometer terminals being engageable by said contactors when said contactors are at said point of balanced resistance.

8. In an electrical circuit, a potentiometer comprising a circular rheostat made up of a series of equally spaced resistances, said rheostat separated into two equal sections by input terminals, a source of continuous voltage connected to said input terminals, a generator, a field winding of said generator, opposed contactors adapted to move over said resistances in sequence connected to said field winding, a point of balanced resistance midway between the terminals on each section, the output E. M. F. applied to said field winding varying from zero when the contactors are at the point of balanced resistance to full load of one polarity when the contactors are adjacent one combination of input terminals, and the E. M. F. applied to said field winding varying from zero to full load of the opposite polarity when the contactors are adjacent the input terminals in a reverse combination, an alternating current source, said potentiometer having a pair of terminals connected to said alternating current source and disposed adjacent said point of balanced resistance and being engageable by said contactors when said contactors are at said point of balanced resistance.

9. In an electrical control system, a D. C. generator including a field winding, a separate D. C. exciter for supplying exciter current to said winding, a potentiometer having a contactor inserted in a circuit between said exciter and said generator, means within the potentiometer to reverse the polarity of the D. C. current supplied to the field winding, there being a point on said potentiometer beyond which movement of said contactor in the same direction causes a reversal of polarity of the D. C. current supplied to said field winding, an alternating current source, and means including said contactor to connect said alternating current source to said field winding when said contactor reaches said point to neutralize the residual magnetism in said field winding.

10. In a control system of the character described comprising a rheostat including a series of spaced resistances, a contactor adapted to move over said resistances in sequence, an output lead connected to said contactor, a generator, a field winding connected to said output lead, an input lead connected to said rheostat, a source of continuous voltage connected to said input lead, said input lead normally delivering E. M. F. through said rheostat and contactor to said output lead, a point between adjacent spaced resistances whereat no E. M. F. is being delivered to said output lead, and an A. C. contact on said potentiometer in alignment with said first named contact, said second A. C. contact being connected to a reference A. C. source whereby A. C. will be delivered to said output lead when said contactor is at said point.

References Cited in the file of this patent

UNITED STATES PATENTS

| Number | Name | Date |
|---|---|---|
| 865,819 | Powell | Sept. 10, 1907 |
| 905,508 | Fleischmann et al. | Dec. 1, 1908 |
| 1,139,201 | Luyken | May 11, 1915 |
| 1,258,116 | Henderson et al. | Mar. 5, 1918 |
| 1,391,529 | Corchat | Sept. 20, 1921 |
| 2,058,561 | Broadwell | Oct. 27, 1936 |
| 2,169,606 | Hutchins et al. | Aug. 15, 1939 |
| 2,239,822 | Larsen et al. | Apr. 29, 1941 |
| 2,258,813 | Schon | Oct. 14, 1941 |
| 2,393,621 | Adams | Jan. 29, 1946 |
| 2,404,760 | Washbond | July 23, 1946 |
| 2,438,534 | Bowers | Mar. 30, 1948 |
| 2,484,262 | Young | Oct. 11, 1949 |
| 2,498,967 | Schaefer | Feb. 28, 1950 |